United States Patent Office 3,280,072
Patented Oct. 18, 1966

3,280,072
ORGANOPOLYSILOXANE ELASTOMERS
Peter G. Frankland, Cardiff, Glamorgan, Wales, assignor to Midland Silicones Limited, London, England
No Drawing. Filed June 24, 1963, Ser. No. 290,204
Claims priority, application Great Britain, June 28, 1962, 24,875/62
8 Claims. (Cl. 260—46.5)

This invention relates to novel vulcanizable elastomeric compositions and to elastomers prepared therefrom.

Room temperature vulcanizing elastomers based on organopolysiloxanes have achieved considerable commercial success and have found employment in a wide variety of applications particularly those involving their use as coating, caulking and sealing materials. Previously known room temperature vulcanizing elastomeric compositions have broadly comprised an organopolysiloxane containing reactive terminal groups, a cross linking agent and a condensation catalyst. These compositions are available as a two package system and vulcanization commences when all three components are brought together.

More recently it has been found that organopolysiloxanes containing silicon-bonded acyloxy radicals as the only reactive groups cure to elastomeric solids when exposed to moisture. These reactive organopolysiloxanes are stable in the absence of moisture and have formed the basis for a one-component room temperature curing system. However, the curing of this one component system is accompanied by the formation of an acid, generally acetic acid, and there are several applications such as in the potting of electronic equipment where the presence of this acid is undesirable.

We have now found that an elastomeric composition which will vulcanize at room or slightly elevated temperatures and which will function as a one component system without evolving an acid during vulcanization can be obtained by mixing in the absence of water (A) an organopolysiloxane convertible to the solid elastic state and containing terminal silicon-bonded hydroxyl groups, and (B) an organosilicon material which is (i) a compound of the general formula $R'_3SiX$ where each $R'$ is an alkoxy radical or a hydrogen atom and X is an amino group or substituted amino group or a monovalent radical containing at least one amino group or substituted amino group attached to the silicon atom through a silicon-carbon or a silicon-nitrogen linkage, or (ii) a compound of the general formula $R''_nSiZ_{4-n}$ in which each $R''$ is an alkoxy radical, a hydrogen atom or a monovalent hydrocarbon radical, each Z is a monovalent hydrocarbonoxy radical attached to the silicon atom through a silicon-oxygen-carbon linkage and containing at least one amino group or substituted amino group and $n$ is 0, 1, 2 or 3 and is not more than 1 when $R''$ is a monovalent hydrocarbon radical, or is (iii) a partial hydrolysate product of (i) or (ii) containing residual amino groups or substituted amino groups.

The invention further provides a process for the manufacture of organopolysiloxane elastomers which comprises mixing in the absence of water (A) an organopolysiloxane convertible to the solid elastic state and containing terminal silicon-bonded hydroxyl groups, and (B) an organosilicon material which is (i) a compound of the general formula $R'_3SiX$ where each $R'$ is an alkoxy radical or a hydrogen atom and X is an amino group or substituted amino group or a monovalent radical containing at least one amino group or substituted amino group attached to the silicon atom through a silicon-carbon or a silicon-nitrogen linkage, or (ii) a compound of the general formula $R''_nSiZ_{4-n}$ in which each $R''$ is an alkoxy radical, a hydrogen atom or a monovalent hydrocarbon radical, each Z is a monovalent hydrocarbonoxy radical attached to the silicon atom through a silicon-oxygen-carbon linkage and containing at least one amino group or substituted amino group and $n$ is 0, 1, 2 or 3 and is not more than 1 when $R''$ is a monovalent hydrocarbon radical, or is (iii) a partial hydrolysate product of (i) or (ii) containing residual amino groups or substituted amino groups, and thereafter exposing the product to water.

The hydroxylated polysiloxanes which form ingredient (A) of the compositions of this invention are substantially linear diorganopolysiloxanes consisting primarily of $R_2SiO$ units and in which the terminal silicon atoms have directly attached hydroxyl groups. Small amounts of $RSiO_{3/2}$ units and/or $R_3SiO_{1/2}$ units can be present in the polymer provided that it does not become resinous in character and that the major proportion of the polysiloxane molecules present are those in which there are present at least one hydroxyl group attached to each of the terminal silicon atoms. The diorganopolysiloxanes can be represented by the general unit formula $R_aSiO_{4-a/2}$ wherein $a$ has a value of from 1.9 to 2.1 and preferably from 1.99 to 2.0. They can be homopolymers or copolymers in which the substituents R are selected from monovalent hydrocarbon radicals for example methyl, ethyl, propyl, phenyl, and vinyl radicals or substituted monovalent hydrocarbon radicals such as chlorophenyl, trifluoropropyl and cyanopropyl radicals. For example the diorganopolysiloxanes can comprise dimethylpolysiloxanes, copolymers of phenylmethylsiloxane units with dimethylsiloxane units, copolymers of methylvinylsiloxane units with dimethylsiloxane units and copolymers of trifluoropropylmethylsiloxane units with dimethylsiloxane units. Operable siloxane polymers include those described in U.S. Patents Nos. 2,843,555 and 2,927,907, as well as Australian Patent No. 216,878.

The amino substituted silanes which are employed in the preparation of the vulcanizable compositions are those in which there is at least one amino group or substituted amino group attached to the silicon atom through a Si—N, Si—C or Si—O—C linkage, the remaining valencies of the silicon atom being satisfied by hydrogen atoms and/or monovalent hydrocarbon radicals or alkoxy radicals. In order that satisfactory vulcanization of the compositions will take place it is necessary that the silane shall contain at least three groups capable of reaction with the vulcanizable organopolysiloxane or shall be capable of producing such reactive groups in the presence of moisture. Suitable amino organosilicon compounds therefore are those having the general formula $R'_3SiX$ where each $R'$ is an alkoxy radical, preferably a lower alkoxy radical such as methoxy, ethoxy or propoxy, or a hydrogen atom and X is an amino group or a monovalent radical containing at least one amino group and attached to the silicon atom through a silicon-carbon or a silicon-nitrogen linkage. As examples of suitable compounds having this general formula there may be mentioned aminopropyl triethoxysilane, N-aminoethyl gamma aminopropyl triethoxysilane and (trimethoxysilylamino) trimethoxysilane. Although compounds of this type cause vulcanization of the organopolysiloxane certain of them, for example, aminotributoxysilane, appear to be less effective than others in their vulcanizing activity. For example when aminotributoxysilane is used alone in the compositions of the invention the application of heat to the compositions is necessary if a prolonged vulcanization time is not desired.

The other suitable class of amino compounds are those of the general formula $R''_nSiZ_{4-n}$ where $R''$ is an alkoxy radical, preferably a lower alkoxy radical such as methoxy, ethoxy or propoxy, a hydrogen atom or a monovalent hydrocarbon radical, Z is a monovalent hydrocarbonoxy radical attached to the silicon atom through a silicon-oxygen-carbon linkage and containing at least one amino group or substituted amino group and $n$ is 0, 1, 2 or 3, $n$ being not more than 1 when R″ is a monovalent hydrocarbon radical. Included in this group of compounds are those such as monoethanolamine orthosilicate
$$[NH_2(CH_2)_2O]_4Si$$
tris(aminoethoxy)vinylsilane
$$ViSi(OCH_2CH_2NH_2)_3$$
and the compound
$$(C_2H_5O)_2Si(OCH_2CH_2)_2NH$$

obtained by the reaction of 1 mol of diethanolamine with 1 mol of tetraethoxysilane. These compounds are capable of causing rapid hardening of the hydroxylated vulcanizable organopolysiloxanes and in many cases produce firm rubbers in less than 24 hours.

In addition to the aminated silanes described above the partial hydrolysate products of the silanes can also be employed in the compositions of this invention provided that there are present in the hydrolysate residual amino groups or substituted amino groups.

The aminated component (B) can be employed in the compositions in an amount ranging from less than 0.1 percent to more than 50 percent by weight based on the weight of the vulcanizable organopolysiloxane (A). The actual amount employed will depend to some extent upon the desired vulcanization time and upon the type of the aminated component employed. Preferably component (B) is present in the composition to the extent of from about 0.2 percent to about 15 percent by weight based on the weight of (A).

Vulcanization of the compositions takes place when the mixture of the diorganopolysiloxane and the organosilicon amino compound is exposed to water, for example in the form of vapour or liquid. The water vapour present in normal atmospheric air will often suffice. The compositions are stable in the absence of moisture and can be stored in sealed containers. This property therefore renders them suitable as one component room temperature vulcanizing compositions. Such compositions can also form the basis of a two component system. For instance, if it is desired to increase the rate of vulcanization by introducing water into the system throughout its volume this can be conveniently achieved by adding the water, if necessary in the form of an emulsion, to the diorganopolysiloxane and storing the organopolysiloxane and the organosilicon amino compound separately until vulcanization is required to take place.

This invention therefore includes within its scope the combination of said water/organopolysiloxane mixture and the amino compound in separate containers.

If it is desired to increase the rate at which vulcanization of the compositions takes place this can be achieved by the addition of a siloxane curing catalyst for example dibutyltin dilaurate and/or the application of heat. However, the use of further vulcanization aids is optional as for most applications a sufficiently rapid vulcanization rate may be obtained without their use. Vulcanization catalysts, often called curing catalysts, operable herein include the metal salts of monocarboxylic acids disclosed in aforesaid U.S. Patents 2,843,555 and 2,927,907 as well as Australian Patent No. 216,878.

In order to impart specific properties to the vulcanized compositions they can be modified by the incorporation of other types of siloxanes and/or fillers. The compositions of the invention can in such case be modified by incorporating therein fillers, for example silicas, surface-treated reinforcing silicas, calcium carbonate, titanium dioxide, magnesium oxide and zinc oxide. When the compositions are to be employed as one component systems any fillers or other additives should be substantially dry before admixing with the other ingredients of the composition.

The compositions can also be modified by the incorporation of other ingredients commonly employed in the compounding of silicone elastomers such as pigments and oxidation inhibitors.

The compositions of this invention are particularly suitable for use as caulking, sealing or potting compounds. They also find use as adhesives, in the preparation of protective coatings and as electrical insulation.

The following examples, wherein Vi=vinyl and isoPr=isopropoxyl, illustrate the invention.

Example 1

0.4 gram of (aminobutoxy)triisopropoxy silane having the formula $NH_2C_4H_8OSi(iOPr)_3$ was intimately mixed with 10 grams of a substantially linear dimethylpolysiloxane having a viscosity of 4500 cs. at 25° C. and containing terminal silicon-bonded hydroxyl groups. The mixture was exposed to the atmosphere at room temperature and cured to a firm transparent rubber in 16 hours.

A similar composition to that prepared above was compounded with 70 parts of a ground quartz filler for every 100 parts of the dimethylpolysiloxane. A sample of the filled composition to which 0.5% water had been added, was poured into a completely enclosed 1¼ inch deep mould. The sample cured to a rubbery solid within 24 hours.

Example 2

0.4 gram of aminopropyltriethoxysilane was stirred into 10 grams of the linear dimethylpolysiloxane employed in Example 1. The mixture was exposed to the atmosphere in a shallow coated paper tray and after 7 days had cured to a firm transparent rubber.

When tris-(aminoethoxy)vinylsilane
$$Vi-Si-(OCH_2-CH_2NH_2)_3$$
was employed in place of the aminopropyltriethoxysilane above the mixture cured to a transparent rubber in 24 hours.

Example 3

100 grams of the linear dimethylpolysiloxane employed in Example 1 was compounded on a 3 roll mill with 70 grams of a ground quartz to give a composition having a viscosity of about 20,000 cs. at 25° C.

When 17 grams of this mixture was mixed in an open vessel with 0.4 gram of $ViSi(OCH_2CH_2NH_2)_3$ the mixture set to a rubber in 24 hours.

A similar mixture was sealed in thin-walled lead tubes, care being taken to exclude moisture. After four weeks the composition was still fluid and when squeezed from the tube and exposed to the atmosphere set to a firm rubber in 2 days.

Example 4

4 g. of monoethanolamine orthosilicate
$$[NH_2(CH_2)_2O]_4Si$$
was intimately mixed with 100 g. of the hydroxylated dimethylpolysiloxane employed in Example 1 and the mixture exposed to the atmosphere in shallow trays. After 24 hours the mixture had set to a firm rubber.

Similar results were obtained when the experiment was repeated with the monoethanolamine orthosilicate replaced with an equal quantity of tetra[dimethylaminoethanol]orthosilicate $Si(OCH_2CH_2NMe_2)_4$ or the compound $(EtO)_2Si(OCH_2CH_2)_2NH$ obtained by the reaction of diethanolamine with tetraethoxysilane.

Example 5

When 4 g. of the compound $(CH_3O)_3SiNHSi(OCH_3)_3$ was intimately mixed with 100 g. of the hydroxylated dimethylpolysiloxane employed in Example 1 the mixture set to a firm rubber after exposure to the atmosphere for 96 hours.

That which is claimed is:

1. An anhydrous composition, stable in the absence of moisture and curable to an elastomer on exposure to moisture consisting essentially of (A) an organopolysiloxane convertible to the solid elastic state and containing terminal silicon-bonded hydroxyl groups said organopolysiloxane consisting essentially of $R_2SiO$ units in which the terminal silicon atoms have directly attached hydroxyl groups, and each R is a monovalent substituent selected from the group consisting of hydrocarbon and halogenohydrocarbon radicals and (B) an organosilicon material selected from the group consisting of (i) compounds of the general formula $R'_3SiX$ where each R' is selected from the group consisting of alkoxy radicals and hydrogen atoms and X is selected from the group consisting of amino groups, and monovalent radicals containing at least one group selected from amino groups and substituted amino groups attached to the silicon atom through a linkage selected from the group consisting of silicon-carbon and silicon-nitrogen linkages, (ii) compounds of the general formula $R''_nSiZ_{4-n}$ in which each R'' is selected from the group consisting of alkoxy radicals, hydrogen atoms and monovalent hydrocarbon radicals, each Z is a monovalent hydrocarbonoxy radical attached to the silicon atom through a silicon-oxygen-carbon linkage and containing at least one group selected from amino groups and substituted amino groups, and $n$ has a value from 0–3 inclusive and is not more than 1 when R'' is a monovalent hydrocarbon radical, and (iii) partial hydrolysates of (i) and (ii) containing residual groups selected from amino groups and substituted amino groups.

2. A composition as claimed in claim 1 wherein the organosilicon material (B) is present in an amount ranging from 0.2 percent to 15 percent by weight based on the weight of the organopolysiloxane (A).

3. A composition as claimed in claim 1 wherein the convertible organopolysiloxane (A) is a dimethylpolysiloxane.

4. A composition as claimed in claim 1 wherein component (B) is a silane of the general formula $R''_nSiZ_{4-n}$ in which each R'' is selected from the group alkoxy radicals, hydrogen atoms and monovalent hydrocarbon radicals, each Z is a monovalent hydrocarbonoxy radical attached to the silicon atom through a silicon-oxygen-carbon linkage and containing at least one amino group and $n$ has a value from 0–3 inclusive and is not more than 1 when R'' is a monovalent hydrocarbon radical.

5. A composition as claimed in claim 1 wherein R' and R'' are lower alkoxy radicals.

6. A composition as claimed in claim 1 which also contains a filler.

7. A process for the preparation of organopolysiloxane elastomers which comprises exposing to water the compositions as recited in claim 1.

8. A process for the preparation of organopolysiloxane elastomers which comprises mixing components (A) and (B) in claim 1 in the presence of water.

References Cited by the Examiner

UNITED STATES PATENTS

| | | | |
|---|---|---|---|
| 2,258,218 | 10/1941 | Rochow | 260—46.5 |
| 2,885,419 | 5/1959 | Beinfest et al. | 260—448.8 |
| 3,065,194 | 11/1962 | Nitzsche et al. | 260—37 |
| 3,068,199 | 12/1962 | Sellers | 260—46.5 |
| 3,082,527 | 3/1963 | Nitzsche et al. | 260—37 |
| 3,133,110 | 5/1964 | Morehouse et al. | 260—448.2 |

FOREIGN PATENTS 625,778   8/1961   Canada.

M. I. MARQUIS, *Assistant Examiner.*

SAMUEL H. BLECH, *Examiner.*

LEON J. BERCOVITZ, *Primary Examiner.*